United States Patent [19]
Smith

[11] 3,975,941
[45] Aug. 24, 1976

[54] OIL WELL RATE METERING METHOD
[75] Inventor: Haldon J. Smith, Jakarta, Indonesia
[73] Assignee: The Raymond Lee Organization, Inc., New York, N.Y. ; a part interest
[22] Filed: Oct. 14, 1975
[21] Appl. No.: 622,366

[52] U.S. Cl.................................. 73/15 R; 73/155
[51] Int. Cl.²................... G01N 25/00; E21B 47/00
[58] Field of Search............. 73/15 R, 36, 154, 155, 73/355; 166/250; 250/25.3, 25.5, 25.6

[56] References Cited
UNITED STATES PATENTS

| | | | |
|---|---|---|---|
| 2,161,733 | 6/1939 | Walker | 73/155 |
| 3,345,868 | 10/1967 | Brink | 73/155 |
| 3,483,730 | 12/1969 | Gilchrist | 73/15 |

*Primary Examiner*—Herbert Goldstein
*Attorney, Agent, or Firm*—Howard I. Podell

[57] ABSTRACT

A process for determining the production rate of an oil well by measuring the intensity of radiant heat from a fire at the end of a flowline leading from the oil well. The oil from the well head is lead through a horizontal flowline to a burn pit and ignited at the end of the flowline. The temperature of the fire is measured from a distance along a path at an angle to the flowline by use of a radiant energy thermoelectric transducer instrument and the reading of the instrument compared with a set of prepared tables.

3 Claims, 3 Drawing Figures

OIL WELL RATE METERING METHOD

SUMMARY OF THE INVENTION

My invention is a process for determining the production rate of an oil well by measuring the intensity of radiant heat from a fire at the end of a flowline leading from the oil well. The oil from the well head is lead through a horizontal flowline to a burn pit and ignited at the end of the flowline. The temperature of the fire is measured from a distance along a path at an angle to the flowline by use of a radiant energy thermoelectric transducer instrument and the reading of the instrument compared with a set of prepared tables.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
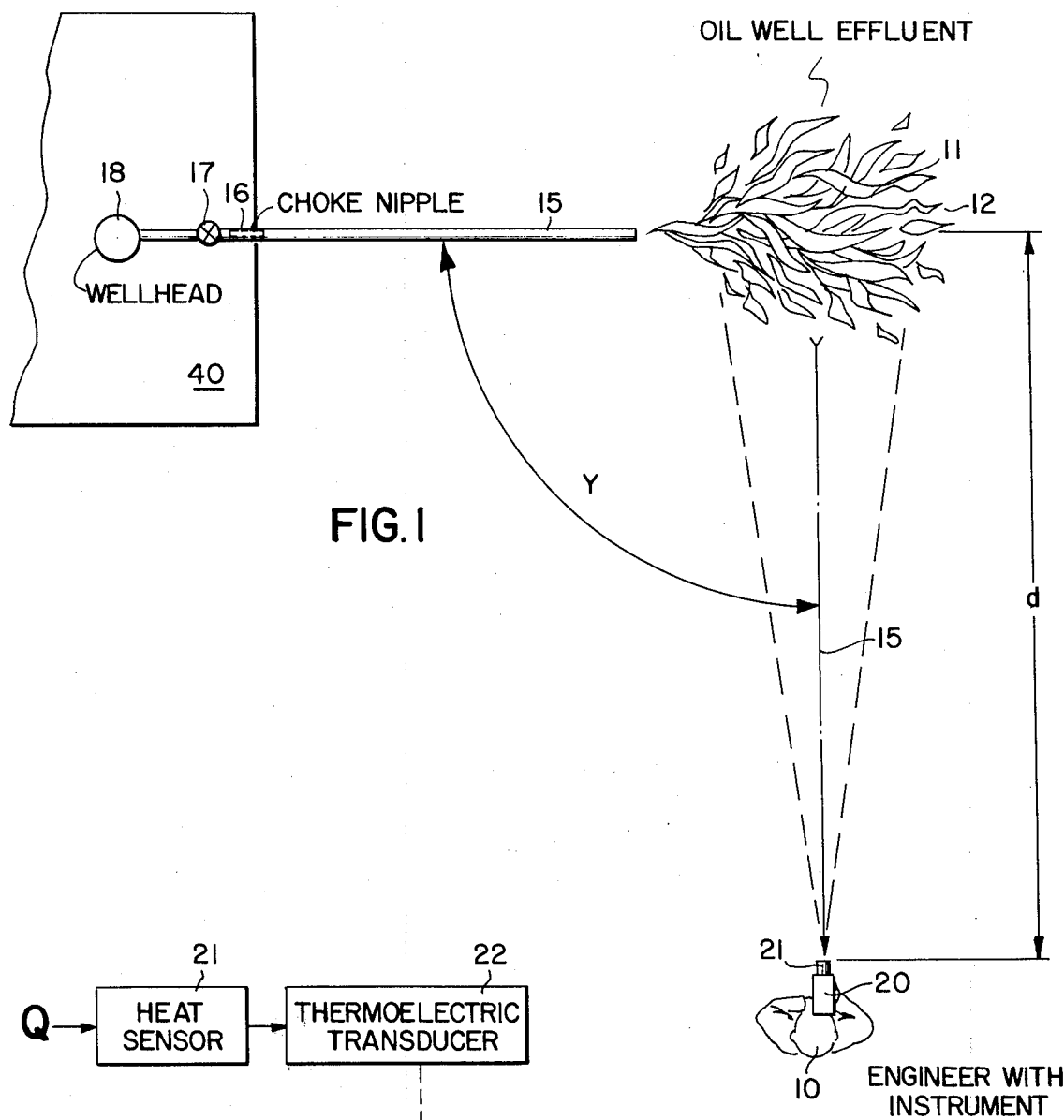
FIG. 1 is a plan view of the invention in use.
Figure 2:
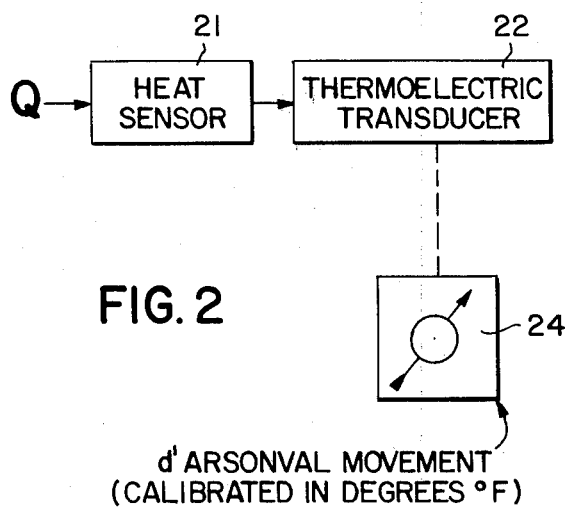
FIG. 2 is a block diagram of the meter.

Turning now descriptively to the drawings, in which similar reference characters denote similar elements throughout the several views, FIG. 1 illustrates an observer 10 determining the temperature of flaming oil 11 along a line of sight 15 that is at an angle Y to a length of pipe 15 which carries the oil from a choke nipple 16 connected to a shut-off valve 17 leading from the well head 18 of oil well 40. The observer points a radiant heat sensor 21 of the instrument 20 at the flames 12. The instrument 20, as shown in FIG. 2, contains a thermoelectric transducer 22 that converts the output of the sensor 21 into an electrical current that feeds a meter movement 24 which is fitted with a scale calibrated in degrees of temperature.

Figure 3:
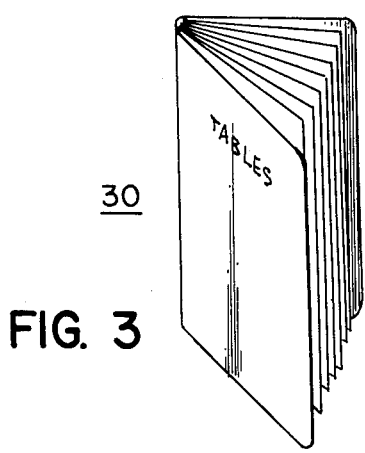
FIG. 3 is a perspective view of a book of tables.

The reading of the meter 24, taken in conjunction with the distance $d$ that the observer is from the flames 12 and in conjunction ith other factors listed in the book of tables 30 shown in FIG. 3, indicates the production rate of the oil well 40.

The factors which are independently determined, prior to use of the instrument 20 are as follows:
  a. Produced gas-oil ratio of the well 40,
  b. Heating value of the produced gas,
  c. Heating value of the stabilized crude oil,
  d. Water-cut, if any,
  e. Flowing well head pressure, and
  f. Ambient temperature read by instrument, prior to fire.

For best results, the angle Y should be taken between 90° and 135°, and that the distance $d$ be selected based on a distance $d$ shown in the book of tables 40.

The use of my method of determining well production rates eliminates the present requirement of a test separator, which weighs over 25,000 pounds and cannot be readily brought to the isolated site of a wildcat well.

Since obvious changes made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A method of determining the production rate of an oil or gas well comprising the steps of
  a. Leading the flow of fluid from the well into a pipe, open at its end,
  b. Igniting the fluid flowing from pipe,
  c. Determining the temperature of the flames by use of a remote radiant sensing apparatus, and
  d. Comparing the temperature determined in step c) with a set of numbers of a prepared table.

2. The combination as recited in claim 1 in which the remote radiant sensing apparatus is set to use a line of sight at an angle of 90° to 135° to the axis of the pipe in which the fluid flows.

3. The combination as recited in claim 1 in which the fluid is an oil-gas mixture.

* * * * *